(12) United States Patent
Johnson et al.

(10) Patent No.: US 7,562,408 B1
(45) Date of Patent: Jul. 21, 2009

(54) SLEEPER STORAGE APPARATUS

(76) Inventors: Kenneth Johnson, 12328 Highway 215 South, Jenkinsville, SC (US) 29065; Kenneth Johnson, 12328 Highway 215 South, Jenkinsville, SC (US) 29065

( * ) Notice: Subject to any disclaimer, the term of this patent is extended or adjusted under 35 U.S.C. 154(b) by 0 days.

(21) Appl. No.: 12/264,471

(22) Filed: Nov. 4, 2008

(51) Int. Cl.
*A47C 21/00* (2006.01)
*B65D 33/06* (2006.01)
*A45C 15/00* (2006.01)

(52) U.S. Cl. ................ 5/658; 5/503.1; 5/118; 5/308; 383/23; 383/39; 224/572

(58) Field of Classification Search ........ 5/9.1, 5/58, 308, 118, 136, 503.1, 658; 296/174; 211/119.006, 85.15; 383/23, 39, 119; 224/275, 224/572
See application file for complete search history.

(56) References Cited

U.S. PATENT DOCUMENTS

| | | | | |
|---|---|---|---|---|
| 2,507,842 | A * | 5/1950 | Waddill | 224/560 |
| 3,014,759 | A * | 12/1961 | Bing | 297/188.06 |
| 3,967,666 | A | 7/1976 | Farrar | |
| 4,108,487 | A * | 8/1978 | Spohn | 296/190.02 |
| 5,337,907 | A | 8/1994 | McKenzie et al. | |
| 5,432,963 | A * | 7/1995 | Coral et al. | 5/118 |
| 5,813,064 | A * | 9/1998 | Hartenstine | 5/99.1 |
| 5,903,938 | A * | 5/1999 | Padilla | 5/8 |
| 6,030,121 | A | 2/2000 | Strzyinski et al. | |
| 6,233,765 | B1 * | 5/2001 | Verhulst | 5/503.1 |
| 6,769,143 | B2 * | 8/2004 | Clarke | 5/58 |
| 2006/0260049 | A1 * | 11/2006 | Wenz | 5/503.1 |

\* cited by examiner

*Primary Examiner*—Michael Trettel
(74) *Attorney, Agent, or Firm*—Crossley Patent Law; Mark A. Crossley

(57) ABSTRACT

The sleeper storage apparatus is partially made of a pliable rectangular panel substantially sized to match a length and width dimension of a bunk in a sleeper cab. The first round rigid spine is removably affixed within the panel top, with a plurality of spaced apart upper straps removably affixed to the first rigid spine. The second rigid spine is removably affixed within the panel bottom with a plurality of spaced apart lower straps removably affixed to the second spine. Each of the upper straps is selectively hooked to one of each of the lower straps, each attached upper and lower strap forming a strap pair. Each strap pair is removably wrapped around the bunk. A plurality of pliable pockets is affixed to the panel, including a hamper pocket with lower opening and trap door to ease in emptying.

9 Claims, 5 Drawing Sheets

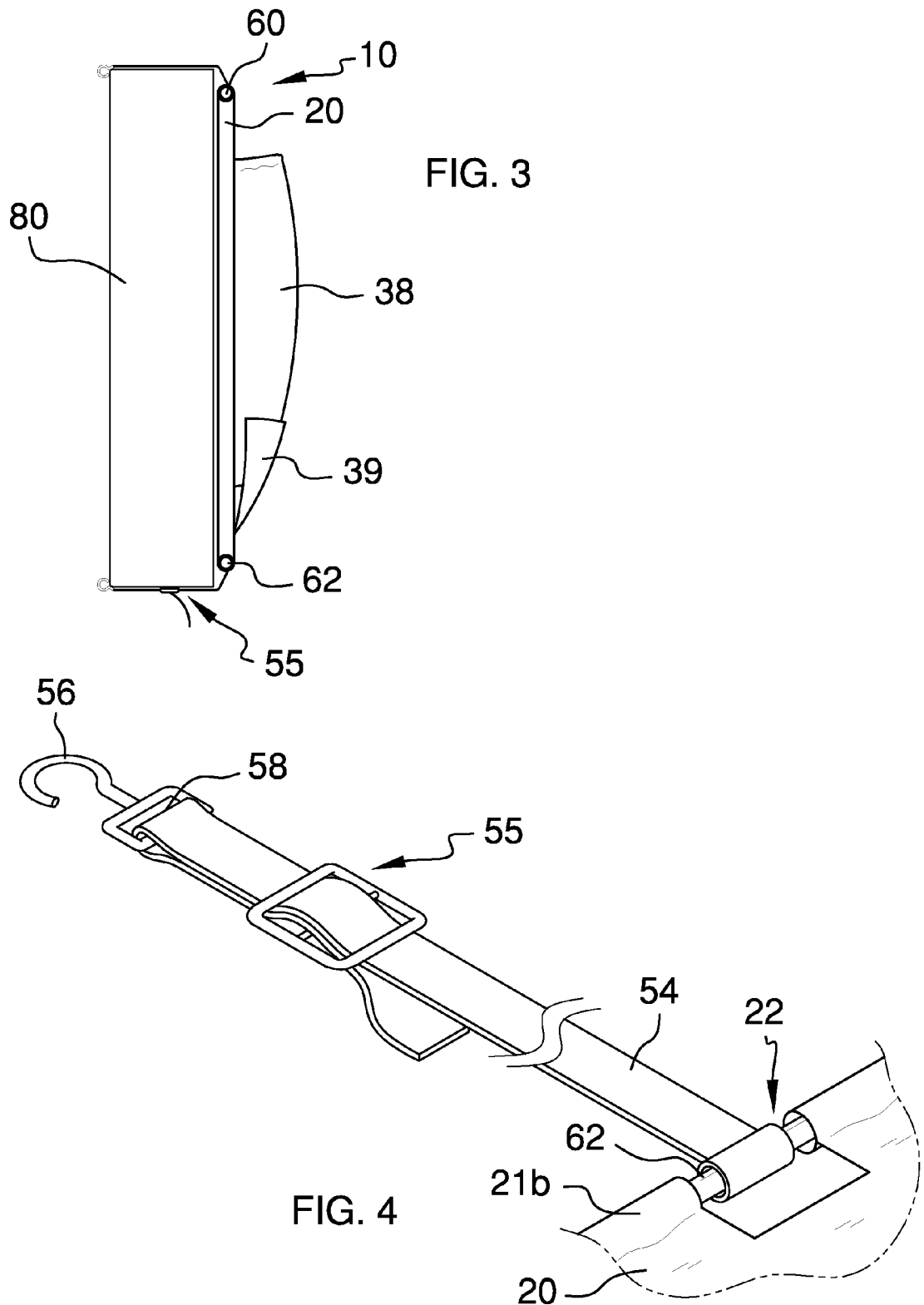

SLEEPER STORAGE APPARATUS

BACKGROUND OF THE INVENTION

Tractor trailers are often equipped with sleeper cabs which provide a limited space living quarters for drivers and co-drivers. With limited being a key word, the comfort of such quarters and the relative happiness of drivers and co-drivers depends greatly on space available and space utilization. Bunks are often catchalls for personal items, laundry, and the like, yet bunks are also needed for rest. What has been needed is an apparatus which provides space efficient storage but in no way interferes with bunk function and space. The present apparatus provides this.

FIELD OF THE INVENTION

The sleeper storage apparatus relates to tractor trailer sleeper accessories and more especially to a sleeper storage apparatus which provides spaced efficient storage without sacrificing bunk function and space.

SUMMARY OF THE INVENTION

The general purpose of the sleeper storage apparatus, described subsequently in greater detail, is to provide a sleeper storage apparatus which has many novel features that result in an improved sleeper storage apparatus which is not anticipated, rendered obvious, suggested, or even implied by prior art, either alone or in combination thereof.

To attain this, the sleeper storage apparatus provides for space efficient, non-interfering storage within a sleeper cab. The apparatus does not interfere with bunk functions within the sleeper. The rigid spines of the apparatus are ideally round and are removable. The apparatus is pliable and washable. Washability further improves with removal of the spines. Removal and installation of the apparatus are easily accomplished without any hardware, tools, or modifications to the apparatus or the sleeper. While the illustrated embodiment features two pocket rows of three pockets each, along with the hamper pocket, the apparatus is not limited to the number of pockets illustrated, whether greater or lesser in number. The trap door of the hamper pocket allows easy emptying of laundry or other items which may be placed within. The multiple strap pairs provide positive retention after installation onto a bunk. The spines provide substantially rigid support of the rectangular panel. The apparatus provides a useful tool for keeping a sleeper cab organized and uncluttered.

Thus has been broadly outlined the more important features of the improved sleeper storage apparatus so that the detailed description thereof that follows may be better understood and in order that the present contribution to the art may be better appreciated.

An object of the sleeper storage apparatus is to provide space efficient storage within a sleeper cab.

Another object of the sleeper storage apparatus is to removably attach to a sleeper cab bunk.

A further object of the sleeper storage apparatus is to negate interference with either bunk within a sleeper cab.

An added object of the sleeper storage apparatus is to require no hardware or modifications for installation and use.

And, an object of the sleeper storage apparatus is to be pliable and washable.

These together with additional objects, features and advantages of the improved sleeper storage apparatus will be readily apparent to those of ordinary skill in the art upon reading the following detailed description of presently preferred, but nonetheless illustrative, embodiments of the improved sleeper storage apparatus when taken in conjunction with the accompanying drawings.

In this respect, before explaining the current embodiments of the improved sleeper storage apparatus in detail, it is to be understood that the sleeper storage apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved sleeper storage apparatus. It is therefore important that the claims be regarded as including such equivalent constructions insofar as they do not depart from the spirit and scope of the sleeper storage apparatus. It is also to be understood that the phraseology and terminology employed herein are for purposes of description and should not be regarded as limiting.

BRIEF DESCRIPTION OF THE DRAWINGS

FIG. 3 is a lateral elevation view of the apparatus installed on a bunk.

FIG. 4 is a perspective view of the lower strap attachment and related strap features.

DETAILED DESCRIPTION OF THE DRAWINGS

With reference now to the drawings, and in particular FIGS. 1 through 6 thereof, the principles and concepts of the sleeper storage apparatus generally designated by the reference number 10 will be described.

Figure 6:
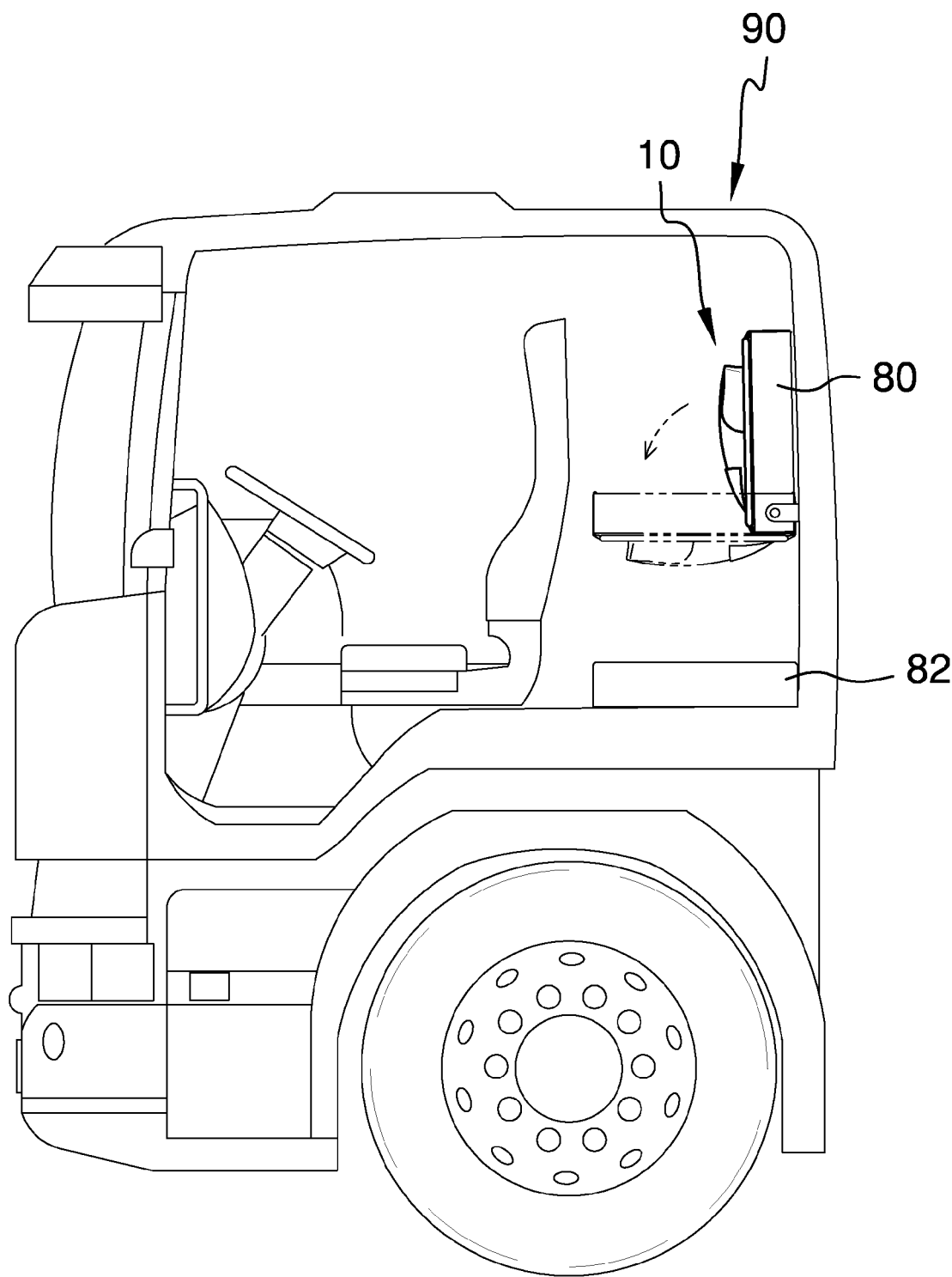
FIG. 6 is a lateral cutaway view of a sleeper with the apparatus installed on a bunk.

Referring to FIGS. 3 and 6, the apparatus 10 is hooked around an existing bunk 80 within a sleeper cab 90. Fold-up and fold-down of the bunk 80 is not interfered with. The apparatus 10 requires very limited space beyond the bunk 80. The existing lower bunk 82 is not interfered with. The apparatus 10 panel 20 is sized to substantially match a length and width of the bunk 80.

Figure 1:
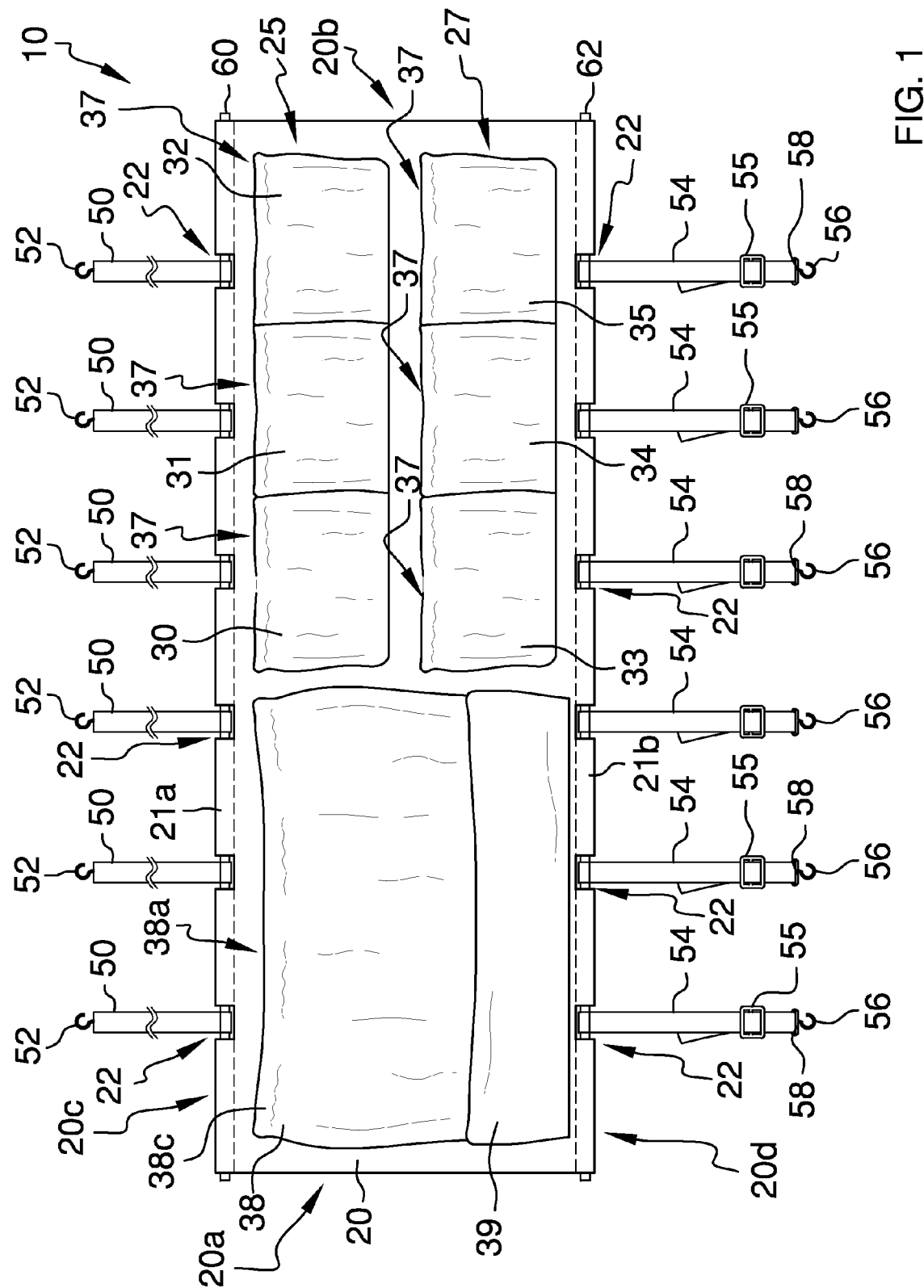
FIG. 1 is a front elevation view.
Figure 2:
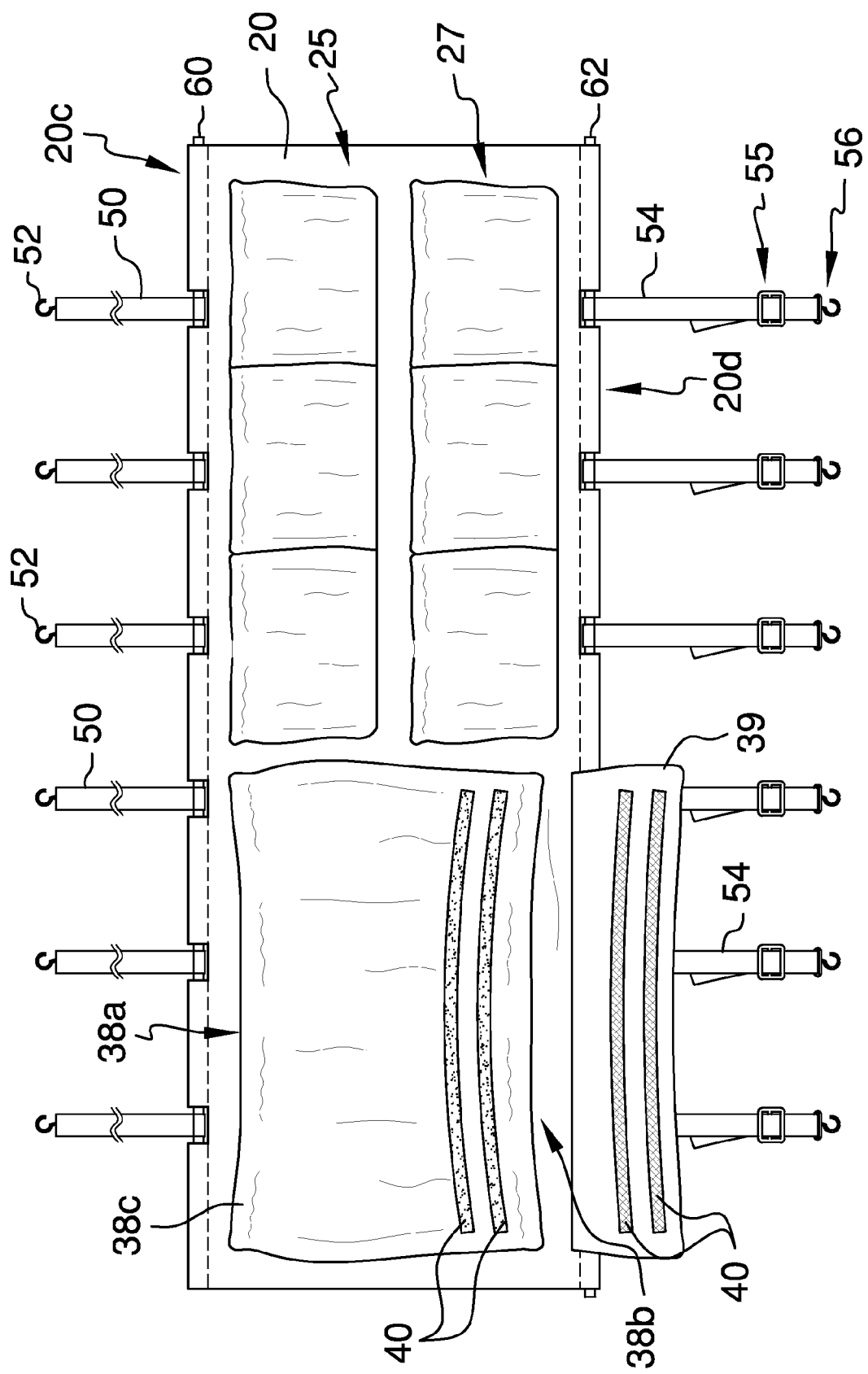
FIG. 2 is a front elevation view, trap door opened.

Referring to FIG. 1, the sleeper storage apparatus 10 comprises a pliable rectangular panel 20 sized to match a dimension of an existing bunk 80 in the sleeper cab 90. The panel 20 has a left side 20a, a right side 20b, a top 20c, and a bottom 20d. The upper loop 21a is disposed at the panel 20 top 20c. The plurality of equidistantly spaced apart cutouts 22 is disposed within the upper loop 21a. The lower loop 21b is disposed at the panel 20 bottom 20d. A plurality of equidistantly spaced apart cutouts 22 is disposed within the lower loop 21b. The first rigid spine 60 is removably disposed within the upper loop 21a. The plurality of upper straps 50 is removably affixed to the first rigid spine 60. One of each of the upper straps 50 is removably affixed to the first rigid spine 60 within each cutout 22. An upper hook 52 is affixed to an outer end of each upper strap 50. The second rigid spine 62 is removably disposed within the lower loop 21b. The plurality of lower straps 54 is removably affixed to the second rigid spine 62.

One of each of the lower hooks 56 is selectively hooked to one of each of the upper hooks 52. Each hooked upper hook 52 with upper strap 50 and lower hook 56 with lower strap 54 forms a strap pair 53.

Referring to FIG. 4, a strap length adjustment 55 is disposed on each lower strap 54. One of each of the lower straps 54 is removably affixed to the second rigid spine 62 within each cutout 22. Each of the spines is slideably fitted within each loop and within each strap. A lower hook 56 is affixed to an outer end of each lower strap 54. Each lower hook 56 further comprises a hook loop 58 through which one lower strap 54 is passed.

Figure 5:
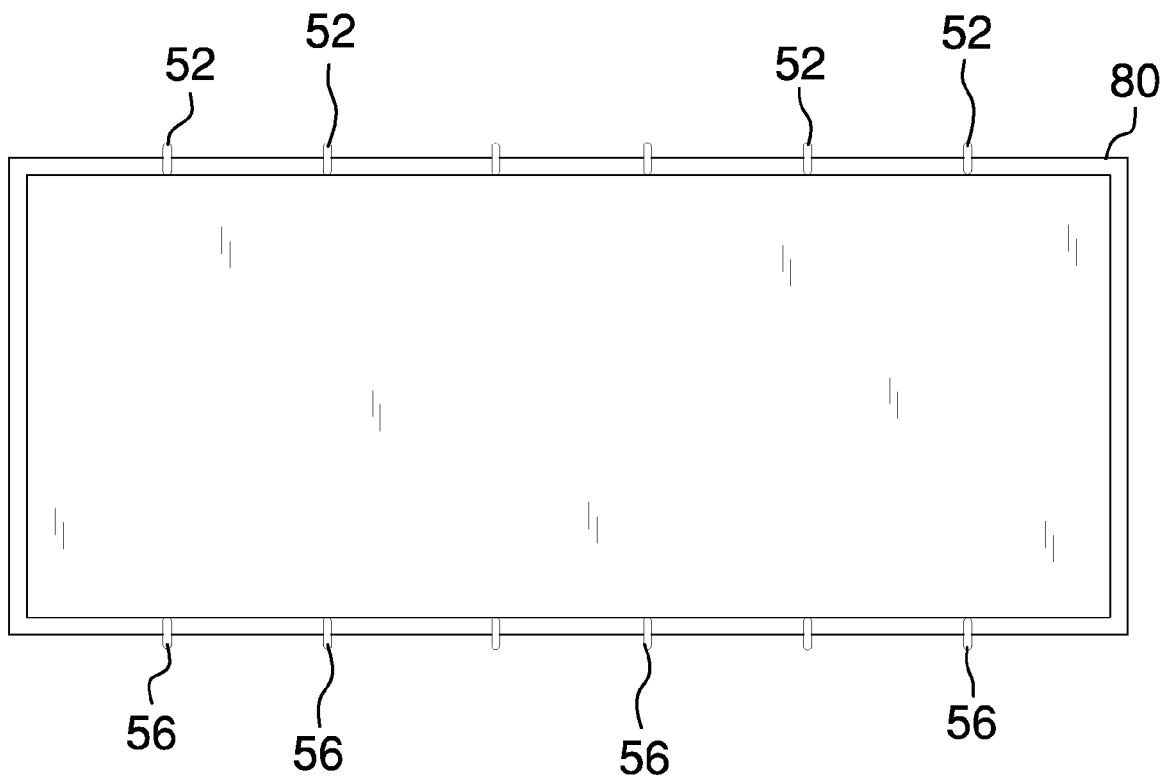
FIG. 5 is a rear elevation view of the apparatus installed on a bunk.

Referring to FIG. 5, each strap pair 53 is selectively hooked around the existing bunk 80. The hooks are selectively and ideally disposed adjacent to the bunk 80 bottom 20d.

Referring to FIG. 2 and again to FIG. 1, the pair of spaced apart pocket rows is most proximal to the panel 20 right side 20b. The pocket rows are disposed between the panel 20 top 20c and the panel 20 bottom 20d. The pocket rows comprise the first pocket row 25 spaced above the second pocket row 27. The first pocket row 25 comprises the first pocket 30 adjacent to the second pocket 31. The third pocket 32 is adjacent to the second pocket 31. The second pocket row 27 comprises the fourth pocket 33 adjacent to the fifth pocket 34. The sixth pocket 35 is adjacent to the fifth pocket 34. An elasticized opening 37 is disposed on each pocket. Each elasticized opening 37 faces the panel 20 top 20c. The hamper pocket 38 is disposed most proximal to the panel 20 left side 20a.

The hamper pocket 38 is disposed between the panel 20 top 20c and the panel 20 bottom 20d. The hamper pocket 38 further comprises the upper opening 38a. The upper opening 38a is disposed proximal to the panel 20 top 20c. The elastic closure 38c is disposed on the upper opening 38a. The lower opening 38b is disposed in the hamper pocket 38. The lower opening 38b is proximal to the panel 20 bottom 20d. The selectively opened trap door 39 is disposed over the lower opening 38b. Hook and loop 40 selectively secures the trap door 39.

With respect to the above description then, it is to be realized that the optimum dimensional relationships for the parts of the sleeper storage apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the sleeper storage apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the sleeper storage apparatus may be used.

Therefore, the foregoing is considered as illustrative only of the principles of the sleeper storage apparatus. Further, since numerous modifications and changes will readily occur to those skilled in the art, it is not desired to limit the sleeper storage apparatus to the exact construction and operation shown and described, and accordingly, all suitable modifications and equivalents may be resorted to, falling within the scope of the sleeper storage apparatus.

What is claimed is:

1. A sleeper storage apparatus, comprising:
   a pliable rectangular panel substantially sized to match a length and width dimension of a bunk in a sleeper cab, the panel having a left side, a right side, a top, and a bottom;
   a first rigid spine affixed to the panel top;
   a plurality of spaced apart upper straps affixed to the first rigid spine;
   a second rigid spine affixed to the panel bottom;
   a plurality of spaced apart lower straps affixed to the second spine;
   means for selectively attaching one of each of the upper straps to one of each of the lower straps, each attached upper and lower strap forming a strap pair, each pair wrapped around the bunk;
   a plurality of pliable pockets affixed to the panel.

2. The apparatus according to claim 1 further comprising a means for adjusting a length of each strap pair.

3. The apparatus according to claim 1 wherein the plurality of pliable pockets further comprises a hamper pocket;
   an upper opening in the hamper pocket, the upper opening proximal to the panel top;
   a lower opening in the hamper pocket, the lower opening proximal to the panel bottom;
   a selectively fastened trap door selectively covering the lower opening.

4. The apparatus according to claim 2 wherein the plurality of pliable pockets further comprises a hamper pocket;
   an upper opening in the hamper pocket, the upper opening proximal to the panel top;
   a lower opening in the hamper pocket, the lower opening proximal to the panel bottom;
   a selectively fastened trap door selectively covering the lower opening.

5. A sleeper storage apparatus, comprising:
   a pliable rectangular panel substantially sized to match a length and width dimension of a bunk in a sleeper cab, the panel having a left side, a right side, a top, and a bottom;
   a first rigid spine removably affixed to the panel top;
   a plurality of spaced apart upper straps removably affixed to the first rigid spine;
   a second rigid spine removably affixed to the panel bottom;
   a plurality of spaced apart lower straps removably affixed to the second spine;
   means for selectively attaching one of each of the upper straps to one of each of the lower straps, each attached upper and lower strap forming a strap pair, each pair wrapped around the bunk;
   a plurality of pliable pockets affixed to the panel.

6. The apparatus according to claim 5 further comprising a means for adjusting a length of each strap pair.

7. The apparatus according to claim 5 wherein the plurality of pliable pockets further comprises a hamper pocket;
   an upper opening in the hamper pocket, the upper opening proximal to the panel top;
   a lower opening in the hamper pocket, the lower opening proximal to the panel bottom;
   a selectively fastened trap door selectively covering the lower opening.

8. The apparatus according to claim 6 wherein the plurality of pliable pockets further comprises a hamper pocket;
   an upper opening in the hamper pocket, the upper opening proximal to the panel top;
   a lower opening in the hamper pocket, the lower opening proximal to the panel bottom;
   a selectively fastened trap door selectively covering the lower opening.

9. A sleeper storage apparatus, comprising:
   a pliable rectangular panel sized to match a dimension of a bunk in a sleeper cab, the panel having a left side, a right side, a top, and a bottom;

an upper loop disposed at the panel top;

a plurality of equidistantly spaced apart cutouts disposed within the upper loop;

a lower loop disposed at the panel bottom;

a plurality of equidistantly spaced apart cutouts disposed within the lower loop;

a first round rigid spine removably disposed within the upper loop;

a plurality of upper straps, one of each of the upper straps removably affixed to the first rigid spine within each cutout;

an upper hook affixed to an end of each upper strap;

a second round rigid spine removably disposed within the lower loop;

a plurality of lower straps, one of each of the lower straps removably affixed to the second rigid spine within each cutout;

a lower hook affixed to an end of each lower strap, each lower hook having a hook loop through which is passed one lower strap, one of each of the lower hooks selectively hooked to one of each of the upper hooks, each hooked upper hook with upper strap and lower hook with lower strap forming a strap pair;

a strap length adjustment disposed on each lower strap;

each strap pair selectively hooked around the existing bunk;

a pair of spaced apart pliable pocket rows most proximal to the panel right side, the pocket rows disposed between the panel top and the panel bottom, the pocket rows comprising a first pocket row spaced above a second pocket row, the first pocket row comprising a first pocket adjacent to a second pocket, a third pocket adjacent to the second pocket, the second pocket row comprising a fourth pocket adjacent to a fifth pocket, a sixth pocket adjacent to the fifth pocket;

an elasticized opening on each pocket, each elasticized opening facing the panel top;

a pliable hamper pocket most proximal to the panel left side, the hamper pocket disposed between the panel top and the panel bottom;

an upper opening in the hamper pocket, the upper opening disposed proximal to the panel top;

an elastic closure on the upper opening;

a lower opening in the hamper pocket, the lower opening proximal to the panel bottom;

a selectively opened trap door disposed over the lower opening.

* * * * *